(12) United States Patent
Povenmire

(10) Patent No.: US 7,277,019 B2
(45) Date of Patent: Oct. 2, 2007

(54) UNIVERSAL COLORIMETRIC IMAGING ARRAY DEVICE

(75) Inventor: Richard M. Povenmire, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 342 days.

(21) Appl. No.: 10/976,727

(22) Filed: Oct. 29, 2004

(65) Prior Publication Data

US 2006/0092030 A1    May 4, 2006

(51) Int. Cl.
*G01W 1/00*    (2006.01)

(52) U.S. Cl. .................. 340/601; 422/55; 422/56; 422/58

(58) Field of Classification Search ........... 340/601; 422/56, 58, 83, 87, 88, 61, 55
See application file for complete search history.

(56) References Cited

U.S. PATENT DOCUMENTS

| | | | | |
|---|---|---|---|---|
| 3,924,219 A | * | 12/1975 | Braun | ............ 338/34 |
| 4,108,729 A | * | 8/1978 | Mennen | ........ 435/287.8 |
| 4,472,353 A | * | 9/1984 | Moore | ............ 422/58 |
| 4,486,536 A | * | 12/1984 | Baker et al. | ......... 436/66 |
| 4,877,580 A | * | 10/1989 | Aronowitz et al. | ....... 422/58 |
| 4,913,881 A | * | 4/1990 | Evers | ............. 422/56 |
| 5,061,636 A | | 10/1991 | Thoraval et al. | |
| 5,091,642 A | * | 2/1992 | Chow et al. | ......... 250/226 |
| 5,397,538 A | * | 3/1995 | Stark et al. | ......... 422/57 |

(Continued)

FOREIGN PATENT DOCUMENTS

| | | |
|---|---|---|
| EP | 0 282 901 B1 | 12/1991 |
| EP | 0 762 116 A1 | 3/1997 |
| EP | 0 762 116 B1 | 6/2004 |

OTHER PUBLICATIONS

Byrne et al., " Digital Imaging as a Detector for Quantitative Colorimetric Analyses," SPIE, 2001, vol. 4205.
Darambara, D.G., "A Generic Radiation Sensor Based on Silicon Memory Devices," Application of Accelerators in Research and Industry, 1997.
Pepper et al., Investigation of Alpha Particle Induced Single-Event Upsets in Charge-Coupled Devices (U), Defense Research Establishment Ottowa, 1991, Report No. 1114.
Lau et al., "Solid-State Ammonia Sensor Based on Berthelot's Reaction," Science and ctuators, 2004, B98.

*Primary Examiner*—Daniel Wu
*Assistant Examiner*—Edny Labbees

(57) ABSTRACT

An apparatus (10) is provided for detecting an atmospheric component. The apparatus, capable of being inserted into an electronic device (30) having an imager (36) and a processor, comprises a substrate; one or more calorimetric reagents (14) positioned on the substrate; one or more reference colors (16), each associated with one of the one or more colorimetric reagents; and data bars (18) positioned on the substrate depicting information about the one or more colorimetric reagents; wherein, when the apparatus is inserted in the electronic device, the imager is capable of detecting colors of the colorimetric reagents based upon the one or more reference colors and information from the data bars, the processor determining whether an atmospheric component is present based upon whether any colors of the colorimetric reagents have changed.

16 Claims, 3 Drawing Sheets

U.S. PATENT DOCUMENTS

| | | |
|---|---|---|
| 5,415,838 A | 5/1995 | Rieger et al. |
| 5,464,588 A | 11/1995 | Bather et al. |
| 6,266,998 B1 | 7/2001 | Hackenberg |
| 6,358,384 B1 | 3/2002 | Warburton |
| 6,495,102 B1 | 12/2002 | Suslick et al. |
| 2003/0044999 A1 | 3/2003 | Singh et al. |
| 2003/0049168 A1* | 3/2003 | Patel et al. .................... 422/58 |
| 2003/0207454 A1* | 11/2003 | Eyster et al. ................... 436/8 |
| 2004/0258561 A1* | 12/2004 | Reimer et al. ................. 422/56 |
| 2005/0042136 A1* | 2/2005 | Marganski et al. ........... 422/58 |

* cited by examiner

UNIVERSAL COLORIMETRIC IMAGING ARRAY DEVICE

FIELD OF THE INVENTION

The present invention generally relates to a device for determining the presence of an unwanted environmental agent and more particularly to a universal device for alerting the device user and others of the presence of an unwanted environmental agent.

BACKGROUND OF THE INVENTION

First responders, such as fire fighters, police, or HAZMAT personnel, many times arrive at the site of an emergency situation without the ability to detect environmental hazards such as toxic industrial chemicals, chemical warfare agents, or radiation. Such inability may result in physical harm to the first responders and other responders that follow. Large quantities of toxic industrial chemicals may be present in populated areas: industrial sites, storage depots, transportation and distribution facilities, resulting in the potential for accidents such as the accidental release of methylisocyanate in Bhopal, India in 1984. Other toxic industrial chemicals, for example, include ammonia, chlorine, hydrogen chloride, and sulfuric acid. Chemical warfare agents are usually more lethal than toxic industrial chemicals. Nerve agents are the most common chemical warfare agents, such as the nerve agent Sarin that was used in the 1995 Tokyo subway gas attack. Other chemical warfare agents, for example, include Tabun, sulfur mustard, and hydrogen cyanide.

Chemical warfare agents typically are medium to high volatility and therefore may be detected in the gas phase. Electronic monitors for chemical warfare agents are based on electronic detection using ion-mobility-spectrometry, photo-ionization and flame-ionization. These tools offer a broadband response with high levels of sensitivity, but most suffer from interference effects caused by what is often a highly complex chemical background mix at the scene, and most commercial tools exhibit high false-positive responses to contaminants. Furthermore, these devices are not designed to be wearable, and most tools, although handheld, are relatively bulky and fully engage the user, thereby detracting from other important duties.

Known colorimetric methods for detecting such chemical and biological hazards include simple color-change badges generally having a life span of approximately 8 hours, to tubes providing quantitative data with high specificity, but both require the user to assess the color change to determine the hazard level. Furthermore, gas tubes are sensitive to physical abuse and are limited in some cases to only one or in other cases a few hazards requiring the user to know what type or types of hazards are suspected.

Radiological threats have become more relevant with the so-called 'dirty bomb', which combines explosive blast with surreptitious ingredients of radionuclides such as Cs-137, a beta and gamma emitter. Radiological monitors (dosimeters) have been available for many years, mostly for occupational safety monitoring. Pager style, wearable units, having audio/visual alerts built-in are available for such monitoring. Also, a variety of miniature radiation detectors exist, such as small Geiger-Muller tubes, selective scintillation layers with photo-sensors, and silicon diodes. Probes can be attached to other types of monitors, covering any of the radiation species, but these monitors are at best hand-held, and must be maintained regularly. Recently, calorimetric badges that detect radiation have been developed; however, these require the user to constantly monitor its status.

The idea of using interchangeable sensor elements for colorimeter detection has been used for water/soil testing, health monitoring, and a wide range of medical testing and analysis applications. However, known calorimeter systems employing interchangeable sensors are not capable of use in a wide range of colorimetric applications, particularly portable applications requiring a single lightweight calorimeter device. Many calorimeters require a PC, spectrometer, or other similar equipment to produce and/or process a colorimetric reagent. Operating these colorimeters is very difficult, requiring constant user interaction to complete the colorimetric detection process whenever a colorimeter measurement is made. These calorimeters require complex recalibration procedures, often involving multiple measurements using one or more sample reagents, each time a different sensor element is used.

Furthermore, existing calorimetric sensor elements that are interchangeable have little or no capability to store reagent related data on the element, and therefore are inherently limited in use to a narrow range of calorimetric applications. Colorimeter devices used for water testing or urinanalysis can use a number of different test strips, each strip containing reagents targeting different substances. But these sensor elements would not be functional if a different set of reagents was deposited on the element. Any change in configuration to the sensor element would require an associated change to the calorimeter detection firmware.

Some calorimetric, and non-colorimetric, systems employ interchangeable elements with embedded calibration data on the sensor element. But these devices have dedicated hardware to read the data using a process unrelated to that used to read the actual calorimetric data, therefore incurring significant increases in cost, size and overall complexity.

Accordingly, it is desirable to provide a universal card that may be interchangeably used in a low cost, low power electronic device for detecting the presence of environmental agents and transmitting the results to the user and others without disrupting from the user's duties. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for detecting an environmental agent. The apparatus, capable of being inserted into an electronic device having an imager and a processor, comprises a substrate; one or more calorimetric reagents positioned on the substrate; one or more reference colors, each associated with one of the one or more calorimetric reagents; and data bars positioned on the substrate depicting information about the one or more calorimetric reagents. When the apparatus is inserted in the electronic device, the imager is capable of detecting colors of the calorimetric reagents based upon the one or more reference colors and information from the data bars, the processor determining whether one or more environmental agents are present based upon colors changes of the colorimetric reagents.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
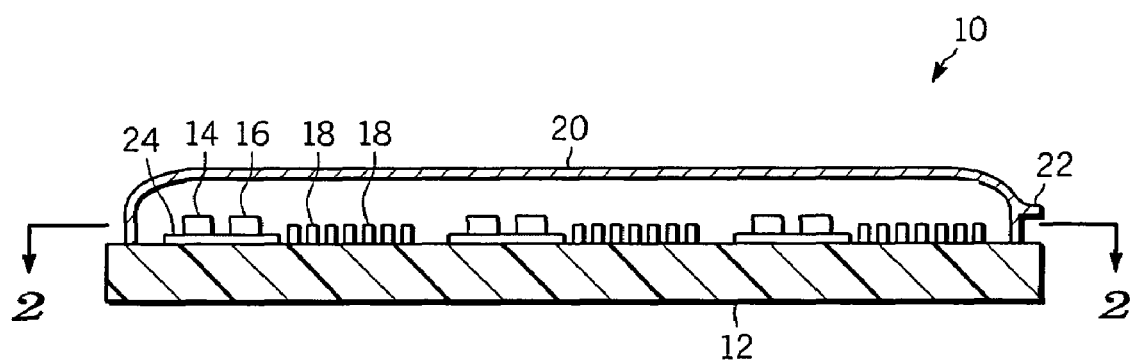
FIG. 1 is a cross sectional view of a first embodiment of the present invention.
Figure 2:
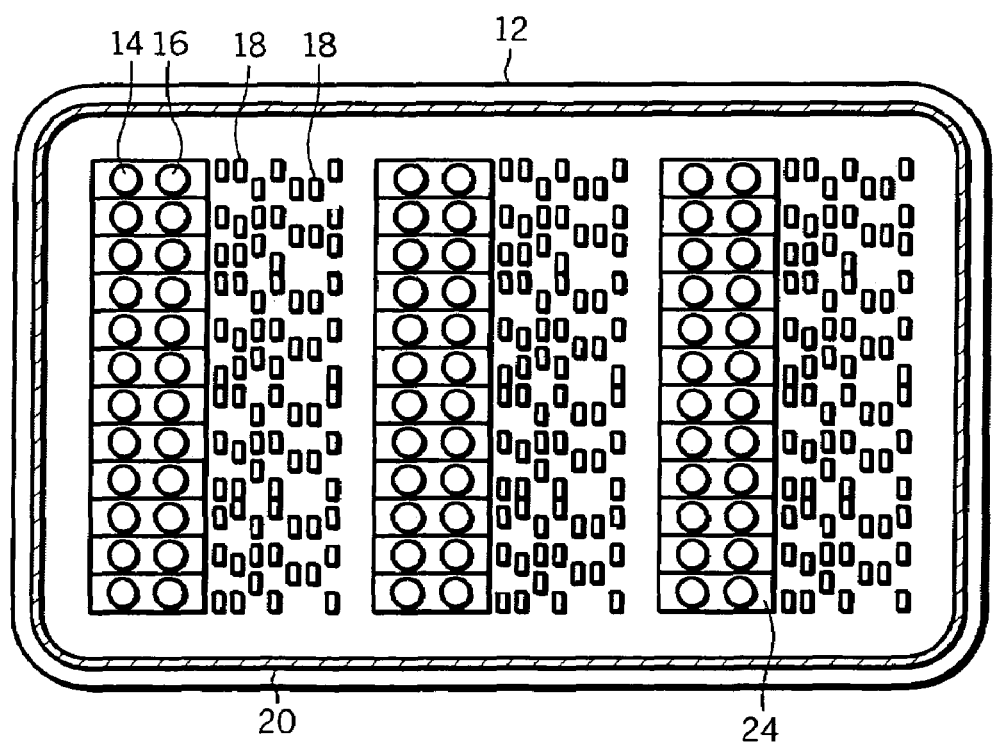
FIG. 2 is a top view taken along the line 2-2 of FIG. 1.

Referring to FIGS. 1 and 2, the apparatus 10 includes colorimetric reagents 14 positioned on card 10. The card may comprise any non-breakable material, such as glass, paper, or plastic. The colorimetric reagents 14 comprise a thin layer of a chemical that maintains a certain color in the absence of an environmental agent, but changes color when subjected to a specific agent. Examples of chemicals that could be used as colorimetric reagents include the following:

The calorimetric reagent 14 comprising $K_2Pd(SO_3)_2$ would turn from yellow to black when exposed to carbon monoxide (CO) in accordance with the equation:

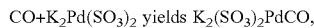

where $K_2(SO_3)Pd\ CO$ yields $CO_2+SO_2+Pd+K_2SO_3$.

The colorimetric reagent 14 comprising $H_3PO_4$ and a pH indicator, for example bromophenol blue, would turn from yellow to blue when exposed to ammonia (NH3) in accordance with the equation:

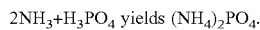

Reference colors 16 are positioned on base 12, each reference color 16 preferably adjacent a corresponding colorimetric reagent 14. The reference color 16 may have substantially the same color as the original, unexposed calorimetric reagent or be set to a color corresponding to a specific level of accumulated exposure.

Data bars 18 are positioned on the base 12, and contain information about each colorimetric reagent 14. Preferably, the data bars 18 containing information about a specific calorimetric reagent 14, as well as the reference color 16, are positioned next to that calorimetric reagent 14. However, it should be understood that the data bars could be placed anywhere on the base 12.

The colorimetric reagents 14, and optionally the reference colors 16 and data bars 18, may be encapsulated in a material 20, for example, paper, plastic, or thin metal, that may be removed by pulling on tab 22. Some calorimetric reagents 14 may have a relative short life span, e.g., approximately 8 hours, in ambient air. The material 20 prevents this life span to begin only when the material 20 is removed, and further protects the colorimetric reagents 14, reference colors 16, and data bars 18, from other damage.

It should be understood that the calorimetric reagents 14, reference colors 16, and data bars 18 may take any format or position on the base 12. For example, the colorimetric reagents 14 may be other than a circle and may be grouped together, separate from the reference colors 16 and data bars 18. However, in the preferred embodiment, each colorimetric reagent 14 and an associated reference color 16 will be positioned adjacent to one another.

Each corresponding calorimetric reagent 14 and reference color 16 optionally may be encompassed within a complimentary color 24 that enhances the detection of the color when imaged.

Figure 3:
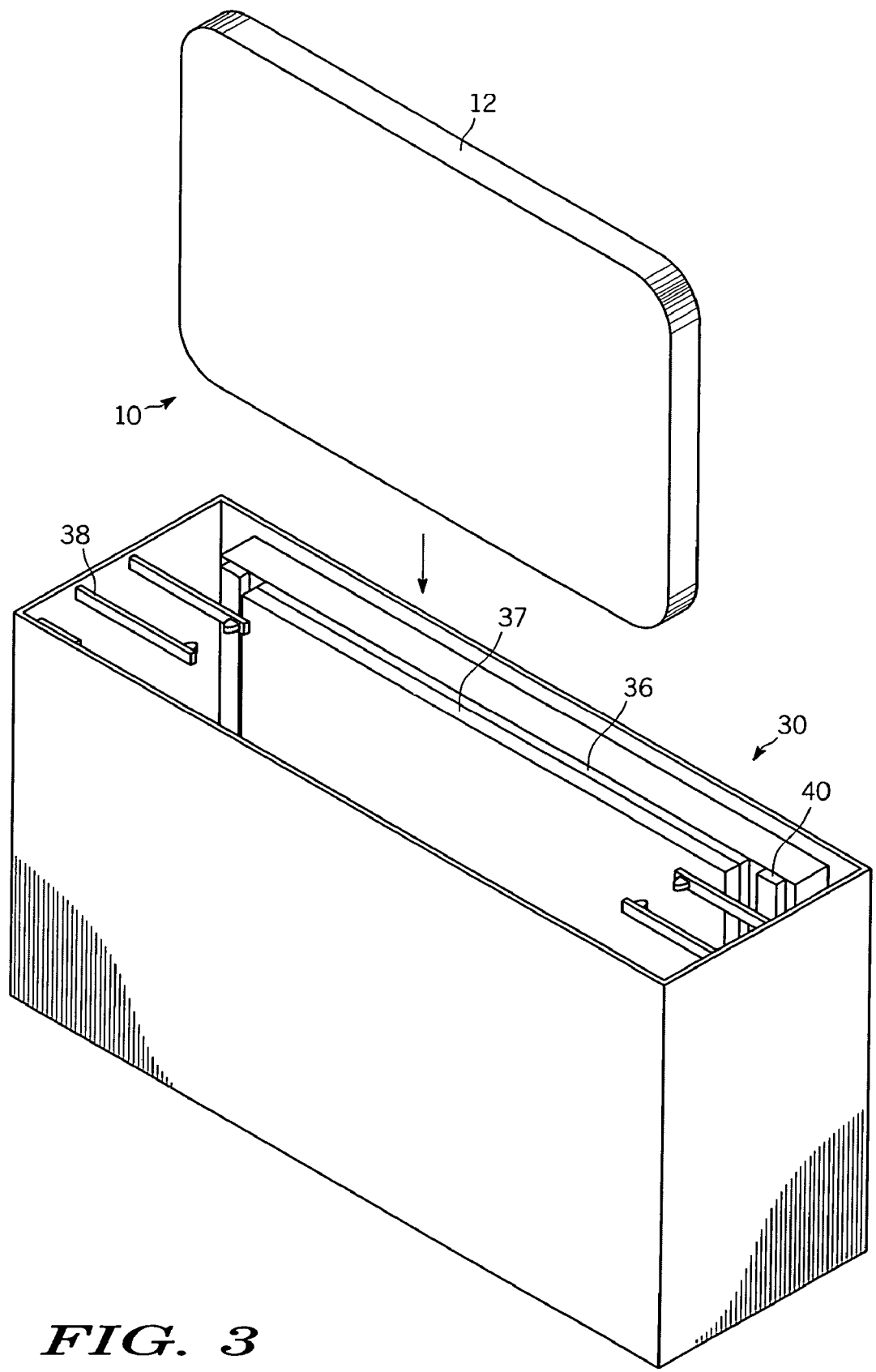
FIG. 3 is an isometric view of the embodiment of FIG. 1 and an electronic device for imaging same.
Figure 4:
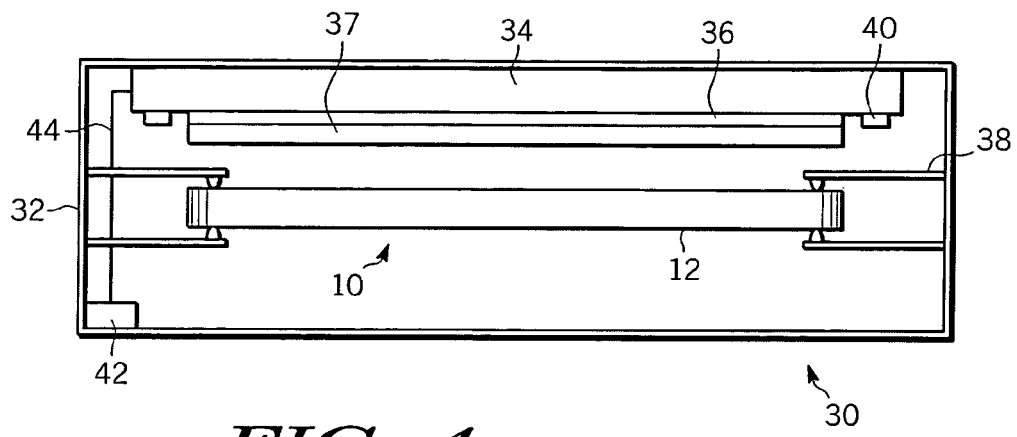
FIG. 4 is a top view of the first embodiment of the invention positioned in the electronic device.

FIG. 3 illustrates how the apparatus 10 may be inserted into an electronic device 30. FIG. 4 illustrates a top view of the electronic device 30, which comprises a base 34 positioned within the housing 32. The base 34 may comprise packaging, an integrated circuit board, or a semiconductor material and may include interface circuitry, a processor, etc., in a manner known to those skilled in the art. An imager 36 is positioned on the base for visually detecting the colors of the colorimetric reagents 14 and is electronically coupled to the processor within the base 12. A lens 37 is positioned on the imager 36 for focusing light from the card 10 onto the imager 36. The card 10 is shown as being inserted within the electronic device 30. The card 10 is held in place by arms 38 and may be easily inserted therein and removed therefrom. An optional light source 40 is provided for directing light onto the colorimetric reagent dots. The light source provides a known spectrum that results in a more reliable determination of the colors of the calorimetric reagent dots than is provided by ambient light. A power source 42 is coupled to the base 34 (and thereby, the imager 36) and the light source 40 by connectors 44, respectively. The power source 42 may be, for example, a battery or an AC adaptor.

Figure 5:
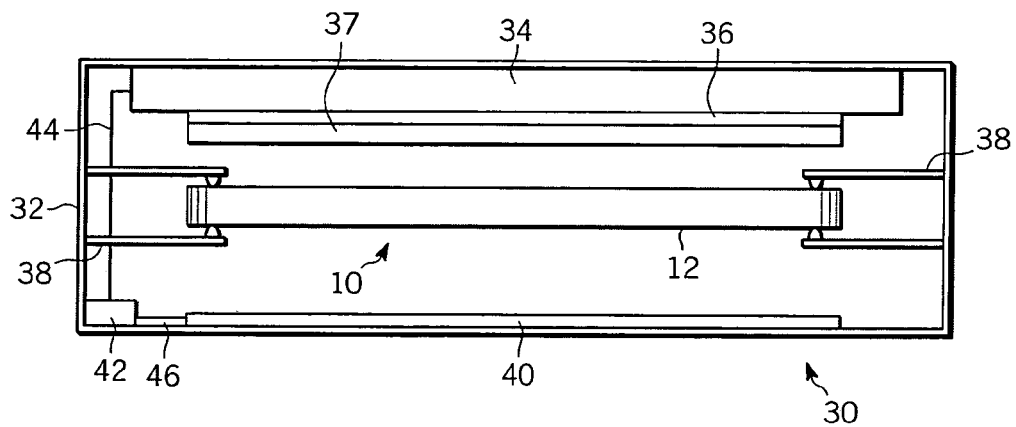
FIG. 5 is a top view of another embodiment of the present invention.

Referring to FIG. 5, an alternate placement of the optional light source 40 allows for light to pass through the apparatus 10 (which would be transparent in this embodiment) and through the colorimetric reagents 14 and reference colors 16.

Figure 6:
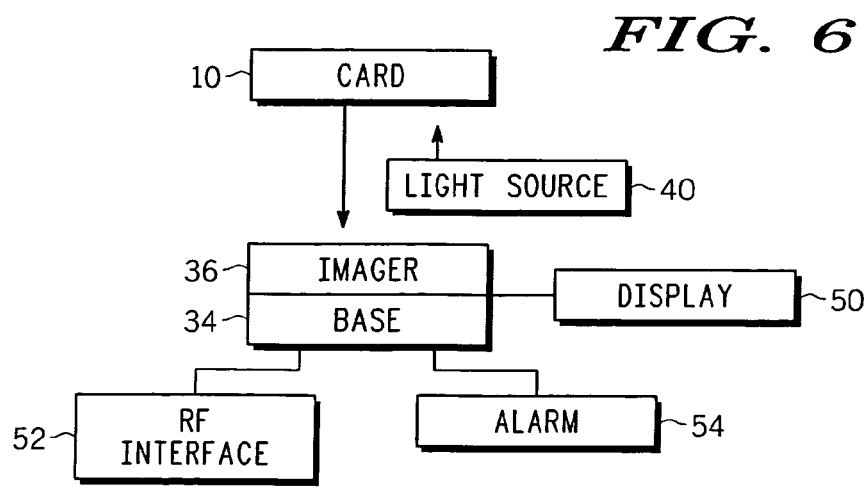
FIG. 6 is a block diagram of the embodiment of FIG. 1 and the electronic device.

Referring to FIG. 6, the card 10 (and colorimetric reagents 14 and reference colors 16) receive light from the light 40, which is then reflected as colored light to the imager 36. The data bars 18 also project a light pattern onto the imager 36. The processor within the base 34 compares this light from the colorimetric reagents with that of the reference colors 16, and based on the information gained from "reading" the data bars 18, makes a determination whether an environmental component is present. The base 34 may be coupled to a display 50 for visually displaying information provided from the processor, an RF interface 52 for transmitting the information to others, and an alarm 54 that would audibly and/or visually alert the user.

When a card 10 is inserted into the device 30, the surface of the card 10 containing the calorimetric reagents 14, reference colors 16, and data bars 18 is positioned facing a miniature lens 37 which focuses light waves reflected from the card 10 surface onto the photodiode array of an imager 36 positioned underneath and concentric with the lens 37 assembly. The imager 36 can sample the light waves focused onto the photodiode array whenever an internal light source 40 is enabled. The light source 40 comprises a set of white LEDs, for example, which are positioned in a tight pattern around the perimeter of the lens assembly, and are also pointed directly at the card 10 surface.

An embedded microcontroller initiates the imaging process by enabling the internal light source 40 to emit sufficient light directly at the card 10 surface. The light waves reflect off of the card 10 surface onto the lens 37, and are focused onto the imager 36 photodiode array. After the light source 40 is enabled, the microcontroller instructs the imager 36 to begin sampling the photodiode array output changes, and the sampled image data is clocked out of the photodiode array serially in a stream of data bytes into the microcontroller for calorimetric detection processing. The microcontroller contains embedded firmware designed to collect and separate the incoming imaged data bytes for each colorimetric reagent' 14 section and it's corresponding reference color 16 section. Each calorimetric reagent 14 and its reference areas are located such that the incoming stream of data bytes is ordered with groups of each reagent's image data adjacent to a corresponding group of reference data. Therefore, the microcontroller alternatively receives groups of colorimetric reagent image data and reference color data, each group providing a set of reagent data bytes that can be subtracted individually from image data bytes in a reference color data group, yielding a group of numbers equal to the difference in their magnitude. This resultant set of difference values is averaged to produce a single value that represents the current colorimetric state of the calorimetric reagent material. This value may be compared to a predefined threshold value indicated in the corresponding data bars, or a set of predefined threshold values to ultimately determine if an alert must be issued.

Card 10 may be disposable, while the electronics of the device 30 may be reused on many occasions, thereby providing a cost advantage. The reference color 16 provides for an accurate on the spot determination of the "original" color of the colorimetric reagent 14, eliminating the need to calibrate the device 30. The data bars 18 provide information about the colorimetric reagents 14, eliminating the need to program each device 30 with such information. Card 10 is a universal "smart" sensor, interchangeable with any card 10 incorporating the methods disclosed here, that enables colorimetric detection for a wide range of applications using a single, low cost, portable device.

This card 10 embeds colorimetric reagent-related data which can be read concurrent with each reagent, avoiding the additional cost size, or complexity incurred by typical sensor designs using dedicated hardware to read the data separate from the actual reagent state.

The reagent-related information provided eliminates the complex reassembly or recalibration procedures required by most calorimeter products employing interchangeable elements. A user doesn't need to perform any setup, reconfiguration, or recalibration of the calorimeter instrument whenever a different card 10 is used.

Card 10 can be exchanged quickly, allowing a user to resume active sensing operation immediately—an important factor in sensing applications involving hazardous substances, or where easy-to-use, portable colorimetric detection devices are needed. As new calorimetric reagents are developed, or different combinations of new or existing reagents are required, the card 10 design will accommodate these new configurations without requiring changes to embedded firmware in the electronic device 30. The card 10 design allows for multiple colorimetric reagents to be deposited on the card 10 surface, independently positioned with regard to the reagent species. Each colorimetric reagent 14 deposition contains embedded data which can be read concurrent with the reagent color state. Although each calorimetric reagent 14 occupies it's own section on the card 10, the physical position of each colorimetric reagent 14 is not used when the element surface is "imaged" to produce blocks of image data containing both the colorimetric state of each colorimetric reagent 14 and the embedded information. In general, the data embedded in the data bars 18 preferably would include the following:

1) specie information identifies the specific substance being detected,
2) parametric information identifies reference color(s) defining the detection thresholds, and
3) expiration date information.

The specie information identifies the substance targeted by each colorimetric reagent 14. The parametric data is comprised of element surface areas specifically colored to match a reagent's color state at important detection thresholds. This idea embeds this reference color data together with each reagent to enable both the reference and reagent color state to be "imaged" simultaneously. Every time a colorimetric reagent 14 is imaged, all corresponding reference color state(s) are imaged concurrently, insuring that any errors introduced during the imaging process (due to changes in lighting, focus, object distance, etc . . . ) are "common" to both the reagent and reference color state data. This "common-mode" noise component is automatically eliminated during the detection processing that follows because only differences in the reference and agent color states are used to determine the actual reagent color state.

This provides a universally interchangeable sensor element 14 that embeds calorimetric reagent data, such that the calorimetric reagent 14 and the data can be read concurrently with a single image processing-based platform to provide colorimetric detection applicable to a broad range of sensing applications. As new colorimetric reagents 14 become available, this design can accommodate these new colorimetric reagents 14 without requiring redesign or firmware updates to the electronic device 30. Furthermore, complex instrument disassembly or recalibration procedures are eliminated during card 10 replacement, allowing for continuous sensing operation without limiting the range of colorimetric applications. Finally, the card 10 provides calorimetric measurement results for each reagent in a differential format which inherently rejects common-mode errors, and consequently, enhances the sensitivity of the colorimeter.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. An apparatus for detecting an environmental agent, capable of being inserted into an electronic device having an imager and a processor, the apparatus comprising:
 a substrate;
 one or more colorimetric reagents on the substrate;
 data bars positioned on the substrate adjacent to the colorimetric reagents, the data bars depicting information about the one or more colorimetric reagents; and
 one or more reference colors positioned on the substrate adjacent to the colorimetric reagents, each of the one or more reference colors associated with one of the one or more colorimetric reagents;
 wherein, when the apparatus is inserted in the electronic device, the imager is capable of detecting colors of the one or more colorimetric reagents and the one or more reference colors and reading information from the data bars, the processor determines whether the environmental agent is present based upon whether any colors of the colorimetric reagents have changed.

2. The apparatus of claim 1 wherein the data bars contain information comprises at least one of a definition of each of the one or more colorimetric reagents, a threshold value for the colorimetric reagent to trigger an alert, and a warning to be displayed or transmitted.

3. The apparatus of claim 1 further comprising a light source that illuminates the one or more reference colors and the one of more colorimetric reagents.

4. An apparatus for detecting an environmental agent, capable of being inserted into an electronic device having an imager and a processor, the apparatus comprising:
   a substrate;
   one or more colorimetric reagents on the substrate;
   data bars positioned on the substrate adjacent to the colorimetric reagents, the data bars depicting information about the one or more colorimetric reagents;
   one or more reference colors positioned on the substrate adjacent to the colorimetric reagents, each of the one or more reference colors associated with one of the one or more colorimetric reagents;
   wherein, when the apparatus is inserted in the electronic device, the imager is capable of detecting colors of the one or more colorimetric reagents and the one or more reference colors and reading information from the data bars, the processor determines whether the environmental agent is present based upon whether any colors of the colorimetric reagents have changed; and
   a removable protective cover encapsulating the colorimetric reagents.

5. An apparatus for detecting an environmental agent, capable of being inserted into an electronic device having an imager and a processor, the apparatus comprising:
   a substrate;
   one or more colorimetric reagents positioned on the substrate;
   one or more reference colors, each associated with one of the one or more colorimetric reagents and positioned adjacent thereto; and
   data bars positioned on the substrate adjacent to the one or more colorimetric reagents and depicting information about the one or more colorimetric reagents, wherein, when the apparatus is inserted in the electronic device, the imager is capable of detecting colors of the one or more colorimetric reagents and the one or more reference colors and reading information from the data bars, the processor determines whether the environmental agent is present based upon whether any colors of the colorimetric reagents have changed.

6. The apparatus of claim 5 further comprising a light source for illuminating the one or more colorimetric reagents.

7. The apparatus of claim 5 further comprising a light source for illuminating the one or more colorimetric reagents and the one or more reference colors.

8. The apparatus of claim 5 wherein the substrate surrounding the reference colors comprises a complimentary color.

9. The apparatus of claim 5 wherein the data bars contain information comprises at least one of a definition of a colorimetric reagent associated therewith, a warning to be displayed or transmitted, and a threshold value for the colorimetric reagent to trigger an alert.

10. The apparatus of claim 5 further comprising a light source for illuminating the one or more colorimetric reagents and the one or more reference colors.

11. The apparatus of claim 5 further comprising a removable protective cover encapsulating the colorimetric reagents.

12. An apparatus for detecting unwanted environmental hazards, comprising:
    a card comprising:
      one or more colorimetric reagents; and
      data bars depicting information about the colorimetric reagents and positioned adjacent to the colorimetric reagents; and
    an apparatus for receiving the card, comprising:
      an imager comprising a photodiode array for detecting colors of the colorimetric reagents and reading information from the data bars; and
      circuitry coupled to the imager for determining changes in colors of the one or more colorimetric reagents within the selected array,
    wherein, when the card is inserted in the apparatus, the apparatus is capable of detecting colors of the one or more colorimetric reagents and reading information from the data bars, the apparatus determines whether the environmental agent is present based upon whether any colors of the colorimetric reagents have changed.

13. The apparatus of claim 9 further comprising one or more reference colors, each associated with one of the one or more colorimetric reagents.

14. The apparatus of claim 9 wherein the substrate surrounding the reference colors comprises a complimentary color.

15. The apparatus of claim 9 wherein the data bars contain information comprises at least one of a definition of each of the one or more colorimetric reagents, a threshold value for the colorimetric reagent to trigger an alert, and a warning to be displayed or transmitted.

16. The apparatus of claim 9 further comprising a removable protective cover encapsulating the colorimetric reagents.

* * * * *

UNITED STATES PATENT AND TRADEMARK OFFICE
CERTIFICATE OF CORRECTION

PATENT NO. : 7,277,019 B2
APPLICATION NO. : 10/976727
DATED : October 2, 2007
INVENTOR(S) : Richard M. Povenmire It is certified that error appears in the above-identified patent and that said Letters Patent is hereby corrected as shown below:

ON THE TITLE PAGE

On the Title Page, in Field (56), under "OTHER PUBLICATIONS", in Column 2, Line 10, delete "ctuators," and insert -- Actuators, --, therefor.

On the Title Page, in Field (57), under "ABSTRACT", in Column 2, Line 4, delete "calorimetric" and insert -- colorimetric --, therefor at each occurrence throughout the patent.

IN THE SPECIFICATION

In Column 2, Line 6, delete "calorimeter" and insert -- colorimeter --, therefor at each occurrence throughout the patent.

In Column 2, Line 10, delete "calorimeters" and insert -- colorimeters --, therefor at each occurrence throughout the patent.

Signed and Sealed this

Fourteenth Day of July, 2009

JOHN DOLL
*Acting Director of the United States Patent and Trademark Office*